United States Patent

Neubauer et al.

[11] Patent Number: 5,953,673
[45] Date of Patent: Sep. 14, 1999

[54] METHOD OF ESTABLISHING A CONNECTION BETWEEN A CALLING SUBSCRIBER OF A TELECOMMUNICATIONS NETWORK AND A CALLED MOBILE TARGET SUBSCRIBER OF A MOBILE RADIO NETWORK

[75] Inventors: Kurt Ferdinand Neubauer; Peter Straka, both of Österreich, Germany

[73] Assignee: Siemens Aktiengesellschaft, Munich, Germany

[21] Appl. No.: 08/750,498

[22] PCT Filed: Jun. 8, 1995

[86] PCT No.: PCT/DE95/00750

§ 371 Date: Dec. 9, 1996

§ 102(e) Date: Dec. 9, 1996

[87] PCT Pub. No.: WO95/35001

PCT Pub. Date: Dec. 21, 1995

[30] Foreign Application Priority Data

Jun. 10, 1994 [DE] Germany ................. 44 20 428

[51] Int. Cl.[6] ........................................... H04Q 7/28
[52] U.S. Cl. ..................... 455/518; 455/518; 455/519; 455/422
[58] Field of Search ..................... 455/433, 439, 455/440, 461, 456, 518, 519, 517, 520, 417; 340/825.44; 379/210, 211, 212

[56] References Cited

U.S. PATENT DOCUMENTS

| 5,467,381 | 11/1995 | Peltonen et al. | 455/433 |
| 5,469,496 | 11/1995 | Emery et al. | 455/461 |
| 5,491,835 | 2/1996 | Sasuta et al. | 455/34.1 |
| 5,493,602 | 2/1996 | Shibayama et al. | 340/825.44 |
| 5,557,655 | 9/1996 | Lantto | 379/58 |
| 5,797,100 | 8/1998 | Dettner | 455/518 |

FOREIGN PATENT DOCUMENTS

| 0546572 A2 | 6/1993 | European Pat. Off. |
| 42 32 863 A1 | 3/1994 | Germany . |
| WO 92/10069 | 6/1992 | WIPO . |
| WO 93/07723 | 4/1993 | WIPO . |

OTHER PUBLICATIONS

Siemens, D900 Mobile Communication System, System Description SYD, 1992, (Order No. A 30808–X3231–X–2–7618) pp. 1–76.

Primary Examiner—Dwayne D. Bost
Assistant Examiner—Jean A. Gelin
Attorney, Agent, or Firm—Hill & Simpson

[57] ABSTRACT

A target subscriber (SB) of the target group defined by a group call number who is best suited with respect to the calling subscriber (SA, SA') of the tele-communications network (PSTN, PLMN') is selected in order to establish a connection with this mobile target sub-scriber (SB). Before the selection of the mobile target subscriber (SB), information on the locations of the mobile subscribers of the target group defined by the dialled group call number and information on the location of the calling subscriber (SA, SA') of the tele-communications network (PSTN, PLMN') is determined and evaluated by the items of equipment of the mobile radio network (PLMN). If there is a network architecture sustaining the structure of an intelligent network, a service control point (SCP) in the intelligent network assumes the selection of the mobile target subscriber (SB). The optimal target subscriber (SB) with respect to the calling subscriber (SA, SA') is, for example, the closest mobile subscriber from the called target group.

18 Claims, 2 Drawing Sheets

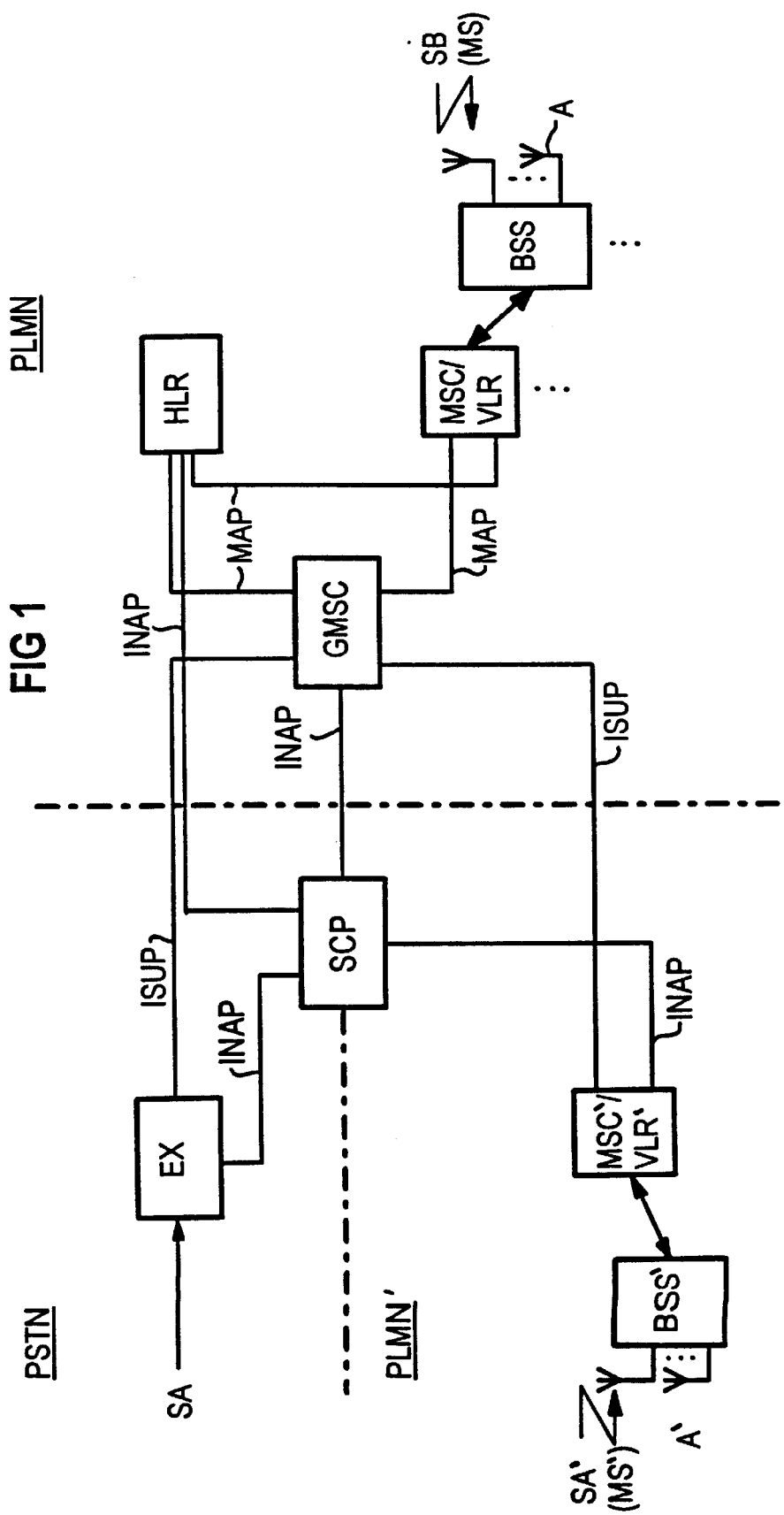

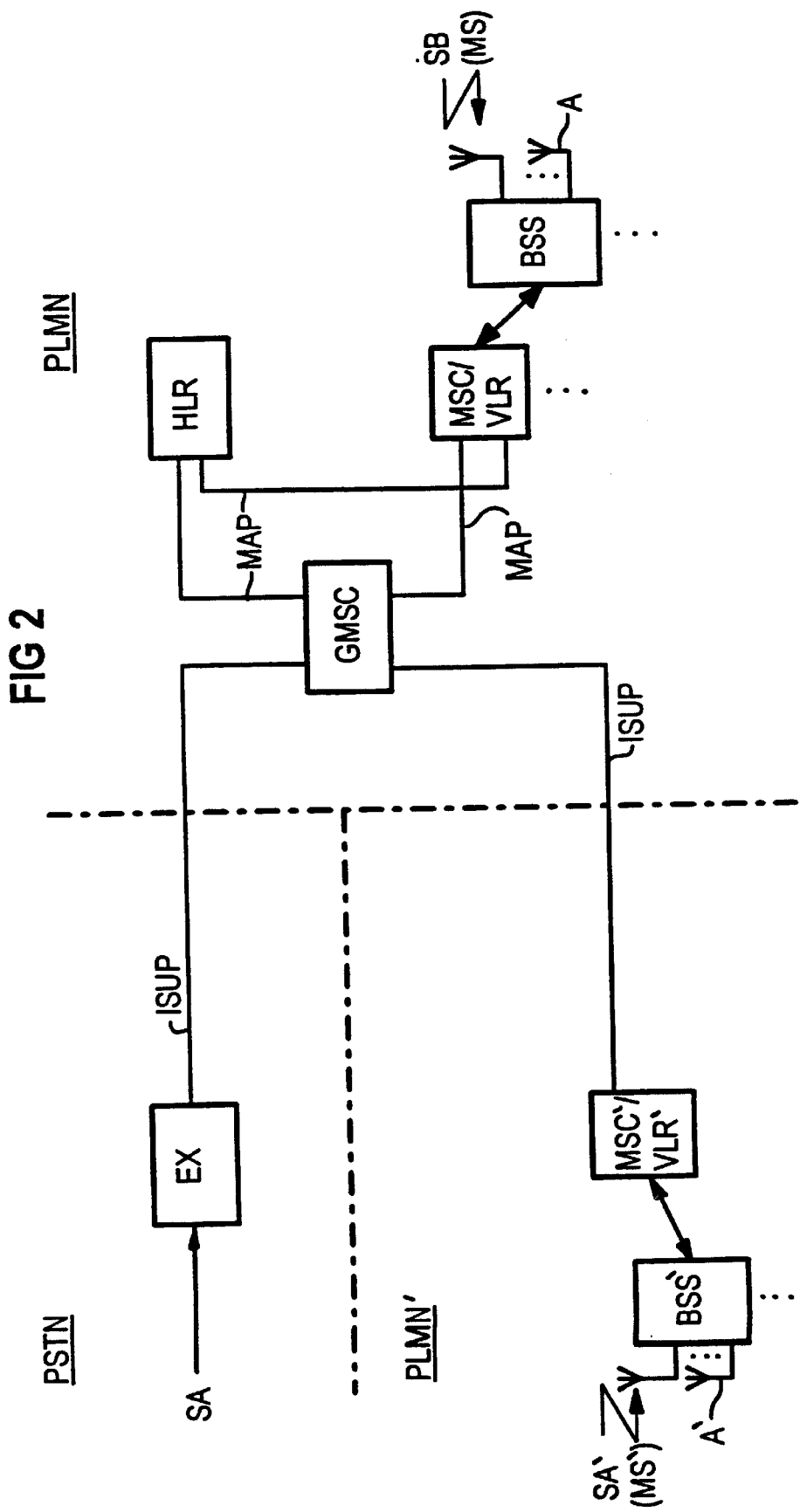

METHOD OF ESTABLISHING A CONNECTION BETWEEN A CALLING SUBSCRIBER OF A TELECOMMUNICATIONS NETWORK AND A CALLED MOBILE TARGET SUBSCRIBER OF A MOBILE RADIO NETWORK

BACKGROUND OF THE INVENTION

Method of establishing a connection between a calling subscriber of a telecommunications network and a called target subscriber of a mobile radio network The invention relates to a method of establishing a connection between a calling subscriber of a telecommunications network and a called mobile target subscriber of a cellular digital mobile radio network.

The system description "D900—mobile communication system", system description SYD, 1992 (order number A30808-X3231-X-2-7618) discloses the structure of a digital cellular mobile radio network conforming to the GSM standard (global system for mobile communication) for the transmission of voice and data. The essential components of the mobile radio network are the base station system, the switching subsystem and the operating and maintenance subsystem. The base station system, comprising a radio part and a hardwired part, represents the interface with respect to the mobile stations of the mobile subscribers of the mobile radio network on the one hand and the interface with respect to the switching subsystem on the other hand, which is responsible for the classical switching functions, including the connections to other telecommunications networks, such as for example the public telephone network or another mobile radio network.

International Patent Application WO 92/10069 discloses a method and an arrangement for connecting a stationary subscriber to a neighboring mobile subscriber with the assistance of a switching system with connected data processing device in a line-connected telephone network. For forming a taxi call system without the intermediary of a telephonist or an operator, location information on the calling stationary subscriber and a plurality of mobile subscribers of a group dialled by a group call number are requested by the data processing device and subsequently evaluated. Thereupon, the taxi driver who is closest with respect to the calling stationary subscriber, who is not already blocked by a call and is free to take on the taxi service required is selected as the mobile subscriber. The selection of the mobile subscriber consequently takes place in the line-connected telephone network by a data processing system in combination with the switching system, which has lines coming in from the stationary subscribers and lines going out to the mobile subscribers. The lines going out from the switching system lead to a mobile radio network, in which a connection via a radio path is established in each case only for the one selected mobile subscriber.

A digital mobile radio network, which has a multiplicity of radio cells for the blanket coverage of the "roaming" mobile subscribers, may also sustain the structure of an intelligent network, which is characterized by decentralized intelligence distributed over the entire network in the individual items of network equipment. The mobile radio network with the structure of an intelligent network has service switching points, service control points and service management systems—see system description "D900 . . .", page 11, Section 2.3. In such a structured intelligent network, new services and supplementary services can be easily and flexibly introduced.

In the GSM mobile radio network, all the interfaces between the items of equipment are standardized. Services and supplementary services in conformity with the GSM standard are available to the mobile subscribers. Also non-standardized supplementary services may be set up, identified by corresponding service codes (supplementary services codes). One of these supplementary services is "mobile access hunting", the utilization of which is intended to have the effect of setting up a connection between a calling subscriber of a telecommunications network and a mobile target subscriber of the mobile radio network, selected from a target group of mobile subscribers. Such target groups are defined by specific groups of persons, such as for example service technicians or employees in field service, or by the type of services which can be used, such as for example taxi call services, private delivery services etc.

SUMMARY OF THE INVENTION

It is the object of the present invention to specify a method of establishing a connection between a calling subscriber of a telecommunications network and a called mobile target subscriber of a mobile radio network in order to make the supplementary service specified above available for use for the subscribers of the telecommunications network.

In general terms the present invention is a method of establishing a connection between a calling subscriber of a telecommunications network and a called mobile target subscriber of a cellular digital mobile radio network, in which a group call number which identifies a target group of mobile subscribers to which the mobile target subscriber belongs is dialled by the calling subscriber, the location of the calling subscriber in the telecommunications network is determined. Information identifying the location of the calling subscriber is received by an access mobile switching system, which in the mobile radio network connects through incoming and outgoing calls from and to the telecommunications network, and from there to a home location register of the mobile radio network. The subscriber data on the mobile subscribers of the target group defined by the group call number is called up by a service control point, which, for handling the services sustains the network structure of an intelligent network, and is transmitted to the home location register. The subscriber data is sent out from the home location register to mobile switching systems in whose areas of responsibility the mobile subscribers of the target group are located, and from there information on the locations of the mobile subscribers of the target group is sent back to the home location register. The information on the locations of the mobile subscribers of the target group and the information on the location of the calling subscriber is received and evaluated by the service control point and, from this information, the mobile target subscriber is selected by the service control point and notified to the home location register. A connection with the selected mobile target subscriber is established by the mobile switching system in the mobile radio network in whose area of responsibility the selected mobile target subscriber is located.

Advantageous developments of the present invention are as follows.

The group call number dialled by the calling subscriber of the telecommunications network is converted into a new group call number for the mobile radio network of the called mobile target subscriber.

The telecommunications network comprises a hardwired telephone network with at least one service switching point, from which the dialled group call number is connected through to the access mobile switching system of the mobile radio network and is transmitted from there to the service control point. The location of the calling subscriber is determined by the service control point on the basis of his subscriber call number and the information on the location is transmitted back together with the new group call number to the access mobile switching system.

The telecommunications network comprises a hardwired telephone network with the network structure of the intelligent network, which has a connection to the service control point via a service switching point. The dialled group call number is connected through by the service switching point to the service control point, and in that the location of the calling subscriber is determined by the service control point on the basis of his subscriber call number and the information on the location is transmitted back together with the new group call number to the service switching point and is passed on from there to the access mobile switching system of the mobile radio network.

The telecommunications network of the calling subscriber comprises a mobile radio network with a mobile switching system responsible for the calling subscriber, by which system the dialled group call number is connected through to the access mobile switching system of the mobile radio network of the called target subscriber and is transmitted from there to the service control point.

The telecommunications network of the calling subscriber comprises a mobile radio network with the network structure of the intelligent network, which has a connection to the service control point. The dialled group call number is connected through by a mobile switching system, responsible for the calling subscriber, to the service control point.

A request for determining the location of the calling subscriber is directed by the service control point to the mobile switching system which is responsible for the calling subscriber in the mobile radio network, in that the location of the calling subscriber is provided by this mobile switching system, or by a base station system connected to the mobile switching system, for establishing radio contacts with the mobile subscribers. The information on the location of the calling subscriber is transmitted together with the new group call number from the responsible mobile switching system of the mobile radio network of the calling subscriber to the access mobile switching system of the mobile radio network of the called target subscriber.

The mobile subscriber of the target group best suited with respect to the calling subscriber is selected as the mobile target subscriber.

The locational and/or temporal selection criteria are used for the selection of the mobile target subscriber of the target group.

The mobile subscriber of the target group who is locationally closest to the calling subscriber is selected as the mobile target subscriber.

The selection of the mobile target subscriber of the target group is carried out on the basis of a selection method equally distributing the call load over the mobile subscribers of the target group or according to priorities assigned to the mobile subscribers of the target group.

In general terms another embodiment of the present invention is a method of establishing a connection between a calling subscriber of a telecommunications network and a called mobile target subscriber of a cellular digital mobile radio network, in which a group call number which identifies a target group of mobile subscribers to which the mobile target subscriber belongs is dialled by the calling subscriber.

The subscriber data of the mobile subscribers of at least one target group and the respective group call number are stored in a home location register. The group call number dialled by the calling subscriber is received by an access mobile switching system, which in the mobile radio network connects through incoming and outgoing calls from and to the telecommunications network, and is transmitted from there to the home location register. It is determined by the home location register that the call number is a group call number of a target group. A mobile target subscriber is selected by the home location register from the mobile subscribers of the target group. A connection with the selected mobile target subscriber is established by the mobile switching system in the mobile radio network in whose area of responsibility the selected mobile target subscriber is located.

Advantageous developments of this embodiment are as follows.

The target group is assigned one or more group call numbers, of which each group call number of the target group is used to distinguish between target areas of the mobile subscribers of the target group.

The mobile subscriber of the target group best suited with respect to the calling subscriber is selected as the mobile target subscriber.

The locational and/or temporal selection criteria are used for the selection of the mobile target subscriber of the target group.

The mobile subscriber of the target group who is locationally closest to the calling subscriber is selected as the mobile target subscriber.

The selection of the mobile target subscriber of the target group is carried out on the basis of a selection method equally distributing the call load over the mobile subscribers of the target group or according to priorities assigned to the mobile subscribers of the target group.

Accordingly, a target subscriber of the target group defined by a group call number who is best suited with respect to the calling subscriber is selected in order to establish a connection with this mobile target subscriber. Before the selection of this mobile target subscriber, information on the locations of the mobile subscribers of the target group defined by the selected group call number and information on the location of the calling subscriber of the telecommunications network is obtained and evaluated by the equipment of the standardized mobile radio network. If there is a network architecture sustaining the structure of an intelligent network, a service control point in the intelligent network takes over the selection of the mobile target subscriber.

If there is no intelligent network architecture characterized by a connection with at least one service control point, the selection of the mobile target subscriber is performed by a home location register provided in the mobile radio network. The home location register stores the subscriber data of the mobile subscribers of at least one target group and the respective group call numbers, of which one group call number or a plurality of group call numbers are assigned to each target group.

For the selection of the mobile target subscriber from the target group defined by the dialled group call number, locational or temporal selection criteria with respect to the mobile subscribers can be taken from the home location register or from the service control point. In addition, it is possible to achieve the selection of the mobile target subscriber by priorities assigned to the individual mobile subscribers of the target group.

The advantage for the calling subscriber is that of dialling a single call number, with which he can in every case reach a mobile subscriber of the target group, and of establishing a connection with the geographically closest and/or temporally optimal selected mobile target subscriber of the group. The advantages for the mobile subscribers belonging to the target group are that of optimizing use of the mobile target subscribers according to temporal and/or locational criteria and of ensuring permanent availability of the group by establishing a connection with one of the mobile target subscribers of the group. By realizing the supplementary service of "mobile access hunting", tasks of private radio networks can be assumed and other services, such as for example taxi services or delivery services, can be offered without the intermediary of an "operator".

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows the block diagram of a network architecture for establishing a connection of a calling subscriber of a public telephone network or mobile radio network with a called mobile target subscriber in a mobile radio network by a service control point sustaining the structure of an intelligent network, and FIG. 2 shows the block diagram of a network architecture for establishing the connection between the calling subscriber and the called mobile target subscriber without the structure of an intelligent network.

DESCRIPTION OF THE PREFERRED EMBODIMENTS

FIG. 1 shows in a basic representation parts of the network structures of a public telephone network PSTN (public switching telephone network) with a calling subscriber SA, of a mobile radio network PLMN' (public land mobile network) with a calling mobile subscriber SA', in place of the subscriber SA, and of a cellular digital mobile radio network PLMN with a called mobile subscriber SB. The telecommunication networks have an architecture sustaining the structure of an intelligent network and characterized by the arrangement of at least one service control point SCP in addition to service switching points (not shown) and service management systems for the management of services and supplementary services in the networks.

The representation in FIG. 1 is to be understood such that a connection is established between the calling subscriber SA of the telephone network PSTN or the calling mobile subscriber SA' of the mobile radio network PLMN' and the called mobile target subscriber SB of the mobile radio network PLMN. The called mobile target subscriber SB belongs to a specific target group, comprising a plurality of mobile subscribers, to which a call is made, according to a "mobile access hunting" supplementary service set up in the mobile radio network, by the subscriber SA or by the mobile subscriber SA' through use of a group call number identifying the target group. Examples of the application of the abovementioned supplementary service are customer service with a multiplicity of service technicians who can be called up, field service with employees who can likewise be reached on a call number of their own, private delivery services, taxi services and the like.

If the subscriber SA of the telephone network PSTN dials a group call number and a connection with the service control point SCP exists in the telephone network PSTN, the location of the calling subscriber SA is determined. For this purpose, the group call number is fed together with the subscriber call number of the subscriber SA by a service switching point EX to the service control point SCP. Between the service switching point EX and the service control point SCP there exists a signalling protocol INAP (intelligent network application part) for the transmission of data and control information. On the basis of the subscriber call number of the subscriber SA, transmitted together with the dialled group call number, the service control point SCP determines the location of said subscriber, i.e. the location of the subscriber line in the hardwired telephone network PSTN. The group call number received is converted into a new group call number, suitable for the mobile radio network PLMN, and this group call number is sent back to the service switching point EX together with information identifying the location of the calling subscriber SA in the telephone network PSTN.

On the basis of an address message (initial address message), the new group call number and the information on the location of the calling subscriber SA are transmitted by the service switching point EX of the telephone network PSTN to a separate mobile switching system GMSC (gateway mobile switching center) of the mobile radio network PLMN with the mobile subscribers of the target group. The separate mobile switching system GMSC serves in the mobile radio network PLMN for connecting through the incoming and outgoing calls from and to the telephone network PSTN or the mobile radio network PLMN' or other telecommunications networks. For the transmission of the data and control information between the service switching points of the various telecommunications networks affected by the call—in the present case between the service switching point EX of the telephone network PSTN and the separate mobile switching system GMSC of the mobile radio network PLMN—there is a corresponding signalling protocol ISUP (integrated services digital network user part).

If the subscriber SA of the telephone network PSTN dials a group call number and no connection with the service control point SCP exists in the telephone network PSTN, the determination of the location of the subscriber SA takes place via the mobile radio network PLMN. After connecting through, the dialled group call number and the subscriber call number of the subscriber SA are transmitted by the service switching point EX by means of the address message to the separate mobile switching system GMSC of the mobile radio network PLMN. For this purpose, the signalling protocol ISUP is likewise used for the transmission of the data and control information between the service switching points in the mobile radio network PLMN and those in the telephone network PSTN.

From the separate mobile switching system GMSC, the subscriber call number of the subscriber SA and the group call number pass to the service control point SCP, which exists on account of the architecture of the mobile radio network PLMN sustaining the structure of an intelligent network. The service control point SCP determines on the basis of the subscriber call number received the location of the subscriber SA and sends information on this location and the new group call number, which is derived from the group call number dialled by the subscriber SA, back to the separate mobile switching system GMSC. For carrying out the control and data operations required for this purpose between the service control point SCP and the mobile switching system GMSC there exists the signalling protocol INAP, which is provided for all the connections with the service control point SCP.

If the call comes from the subscriber SA' of the mobile radio network PLMN' and a connection with the service control point SCP exists in this network, the determination of the location of the subscriber SA' takes place in this mobile radio network PLMN'. By establishing a radio contact between the mobile station MS' and one of a plurality of antennas A', the group call number dialled by the calling subscriber SA', which said subscriber enters into his mobile station MS' and the subscriber call number of the calling subscriber SA' pass to a base station system BSS', which is connected by a line to a mobile switching system MSC' with associated visitor location register VLR'. The mobile switching system MSC' in this case takes over the switching functions in an assigned local area for the mobile subscribers respectively located therein at the time. The associated visitor location register VLR' stores the corresponding subscriber data of the mobile subscribers. Apart from the base station system BSS', there may be arranged further base station systems, which are respectively connected to a mobile switching system. From the mobile switching system MSC', the two call numbers received are passed on to the service control point SCP.

The service control point SCP establishes on the basis of the notified subscriber call number of the calling mobile subscriber SA' that the location of the latter, i.e. the location of the associated mobile station MS', is to be requested from the responsible base station system BSS', and sends a message to the mobile switching system MSC', with which message the information on the location of the calling mobile subscriber SA' in the mobile radio network PLMN' is requested. The message contains, inter alia, the new group call number for the mobile radio network PLMN, which is derived from the dialled group call number.

The determination of the momentary location of the calling mobile subscriber SA', moving ("roaming") between the various local areas and covered by corresponding radio cells in the mobile radio network PLMN', can be carried out with differing accuracy. In this respect, a distinction is to be drawn between the accuracy with respect to the mobile switching system MSC', which can serve a plurality of local areas, or with respect to a local area code identifying the respective local area, or with respect to the radio cell currently covering the mobile subscriber SA' and having an associated identification number (cell identity). In the case of the two first-mentioned possibilities, the location information is made available by the responsible mobile switching system MSC', while the identification number of the responsible radio cell is supplied by the base station system BSS'. The base transmitting/receiving stations of the base station system BSS' contain all the radio equipment for the respective mobile subscribers in the radio cells. A further possibility of location determination is to start, on request, a search function in which the precise location of the mobile caller is measured by the base transmitting/receiving stations of the base station system BSS' using, for example, a point-to-multi-point signal delay measuring method.

In all cases, the mobile switching system MSC1' receives information on the location of the calling mobile subscriber SA', which is passed on, on the basis of the address message, together with the new group call number to the separate mobile switching system GMSC of the mobile radio network PLMN. Since the data transmission takes place between the mobile switching system MSC' of the mobile radio network PLMN' and the separate mobile switching system GMSC of the mobile radio network PLMN, the signalling protocol ISUP suitable for this is used.

If the calling mobile subscriber SA' dials a group call number via his mobile station MS' and no connection with the service control point SCP exists in the mobile radio network PLMN', the determination of the location of the mobile subscriber SA' takes place via the mobile radio network PLMN of the called mobile subscriber SB. The dialled group call number and the subscriber call number identifying the calling mobile subscriber SA' are connected through by the mobile switching system MSC' of the mobile radio network PLMN' to the separate mobile switching system GMSC of the mobile radio network PLMN and sent from there to the service control point SCP. The service control point SCP detects on the basis of the subscriber call number received that the location of the calling mobile subscriber SA' can be determined in the mobile radio network PLMN', and transmits a request for determination of the location back to the separate mobile switching system GMSC of the mobile radio network PLMN. The separate mobile switching system PMSC passes on this request to the responsible mobile switching system MSC' in the mobile radio network PLMN', in which the location information is determined in the manner specified above. Together with the request for determination of the location of the calling mobile subscriber SA', the new group call number, which is derived from the dialled group call number, is transferred from the service control point SCP to the separate mobile switching system GMSC of the mobile radio network PLMN. The mobile switching system MSC' of the mobile radio network PLMN' sends the information determined on the location of the calling mobile subscriber SA' to the separate mobile switching system GMSC of the mobile radio network PLMN.

From the separate mobile switching system GMSC, the location information with respect to the calling subscriber SA of the telephone network PSTN or of the calling mobile subscriber SA' of the mobile radio network PLMN' and the group call number provided for the identification of the target group of the mobile subscribers from which the called mobile target subscriber is selected are sent to a home location register HLR of the mobile radio network PLMN. In this case, a signalling protocol MAP (mobile application part) is used for the transmission of the data and control information between the items of equipment of the cellular digital mobile radio network PLMN.

Using the signalling protocol INAP, the home location register HLR, to be regarded as a central subscriber database, requests from the service control point SCP the subscriber data of the mobile subscribers of the target group defined by the dialled group call number. Therefore, the new group call number resulting from the dialled group call number is transmitted to the service control point SCP. The service control point SCP supplies to the home location register HLR the subscriber data of the mobile subscribers of the called target group and information on which mobile subscribers of the target group are currently busy, which local areas which are defined by the associated area code are covered by the mobile subscribers of the target group etc. In this case, a division of the mobile subscribers of the target group into subgroups is possible.

After receiving the subscriber data of the mobile subscribers of the called target group, messages are sent from the home location register HLR to the mobile switching systems MSC . . . of the mobile radio network PLMN in whose areas of responsibility the mobile subscribers of the target group are located. The messages contain all the subscriber data and information significant for the mobile subscribers of the target group. The mobile switching systems MSC . . . , to which there are assigned visitor location registers VLR . . . for storing the subscriber data of the mobile subscribers currently located in the respective area of responsibility, request the information on the locations of the individual mobile subscribers of the target group in the mobile radio network PLMN. In the case of determination of the locations dependent on the desired accuracy with respect to the mobile switching system or with respect to the local area, the respective location information is made available by the home location register HLR, while in the case of choosing accuracy with respect to the radio cell with the associated identification number the location information is supplied on request by the respective base station systems BSS . . . of the mobile radio network PLMN. In addition, as in the mobile radio network PLMN' of the calling mobile subscriber SA', there is the possibility of determining the locations by the previously specified signal delay measuring method, which is carried out on request by the respectively responsible base station systems BSS . . . .

In analogy with the base station system BSS' of the mobile radio network PLMN', the base station system BSS has a plurality of base transmitting/receiving stations, which are connected to antennas A for a multiplicity of radio cells and, for establishing radio contacts via the air interface, with the mobile stations MS of the mobile subscribers. In the determination of the locations of the mobile subscribers of the target group, use may additionally be made of information in the transmitted data for identifying the mobile subscribers the target group with respect to the already established location of the calling subscriber SA or SA'. In addition, the state of the individual members of the target group, i.e. whether the mobile subscriber is active or inactive, may be checked for establishing the location. Before the determination of the location of each individual mobile subscriber of the target group can begin, a check on the respective mobile subscriber with respect to his availability can also be carried out.

Of the mobile switching systems MSC . . . affected—i.e. of the mobile switching systems in whose areas of responsibility the mobile subscribers of the target group affected by the call are located—the information on the locations of the mobile subscribers of the target group is transmitted back to the home location register HLR. In this case, the signalling protocol MAP is again used for the transmission of the data and control information. The home location register HLR gathers the information received from the mobile switching systems MSC . . . concerning all the mobile subscribers of the target group and sends this information together with the information identifying the location of the calling subscriber SA or SA' to the service control point SCP.

The service control point SCP selects on the basis of the information received the mobile subscriber of the target group best suited with respect to the calling subscriber SA or SA' as the mobile target subscriber SB. The best suited mobile target subscriber is the subscriber of the target group who is, for example, closest to the calling subscriber SA or SA'.

The selection criterion according to locational aspects may be supported by additional geographical information made available by a correspondingly designed information system, for example in the service control point SCP. Instead of the locational aspects and, if appropriate, geographical aspects to be additionally taken into consideration, the selection may also be carried out according to time limits and/or datum limits, in which the individual mobile subscribers of the target group can receive the call, or according to fixed selection algorithms, which select the mobile target subscriber according to an equal distribution of the call loading, cyclically or according to assigned priorities for the mobile subscribers of the target group. The number of mobile sub-scribers per target group may be fixed variably, depending on the area of use of the available supplementary service of "mobile access hunting".

The home location register HLR is notified by the service control point SCP of the selected mobile subscriber of the target group as the called mobile target subscriber SB and said register informs the separate mobile switching system GMSC of the mobile radio network PLMN of the selected mobile target subscriber. The separate mobile switching system GMSC starts the establishing of a connection by connecting through the call to the mobile switching system in whose area of responsibility the selected mobile target subscriber is located in the mobile radio network PLMN. The establishing of a connection takes place according to a standardized procedure, which is fixed for all calls to be put through to the mobile subscribers of the mobile radio network PLMN, as described for example in the system description "D900 . . . ", page 62.

FIG. 2 shows the same telecommunications networks as FIG. 1, with the exception that there is no service control point SCP for sustaining the structure of an intelligent network. If the calling subscriber SA in the telephone network PSTN or the calling mobile subscriber SA' in the mobile radio network PLMN' dials a call number which is a group call number for identifying a target group comprising a plurality of mobile subscribers, this call number is transmitted by the respective service switching point in the respective telecommunications network—i.e. by the service switching point EX in the telephone network PSTN or by one of the mobile switching systems MSC' . . . . in the mobile radio network PLMN'—to the separate mobile switching system GMSC of the mobile radio network PLMN. The separate mobile switching system GMSC and the service switching points EX or MSC . . . communicate with one another via the signalling protocol ISUP. Each target group may in this case also be assigned a plurality of group call numbers, so that by dialling one of these group call numbers the target area of the called mobile subscriber is defined even more distinctly. The group call number received is handled like every other call number by the separate mobile switching system GMSC and made available to the home location register HLR, which identifies the dialled call number as a group call number. The transmission of the group call number from the separate mobile switching system GMSC takes place on request (interrogation) by the home location register HLR.

The home location register HLR of the mobile radio network PLMN stores the subscriber data of the mobile subscribers of each target group and the group call numbers of the target groups. For the supplementary service of "mobile access hunting", the home location register HLR provides algorithms for selection of the best suited mobile subscriber of the target group dialled, the selection being performed according to locational and/or temporal requirements or according to hierarchical or cyclical aspects of the home location register HLR. The home location register HLR supplies in addition to the subscriber data on the mobile subscribers of the respective target group information on specific characteristics of the overall target group and the point in time for initiating the selection mechanism.

For use of the supplementary service of "mobile access hunting" (MAH), the group call number identifying the call as an MAH call is transmitted from the separate mobile switching system GMSC to the mobile switching system responsible for the selected mobile target subscriber SB (visited MSC), in order to distinguish the MAH call from other calls.

The mobile switching system which is responsible for the selected mobile target subscriber SB of the target group receives from the home location register HLR information on this target subscriber, to the mobile station MS of which the connection is to be established via the base station system BSS and the antennas RA connected thereto. The establishing of a connection takes place according to the standardized procedure, which is described—as specified above—in the system description "D900 . . . ".

Establishing the connection is repeated if the call by the subscriber SA or SA' could not be put through to the mobile target subscriber SB. Reasons for the failure to establish the connection may be absence, nonavailability or inadequate response within a predetermined period of time. The repeat operation is started by a request from the mobile switching system responsible for the selected mobile target subscriber SB to the associated visitor location register to transfer the subscriber data significant for the selected mobile target subscriber.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method of establishing a connection between a calling subscriber of a telecommunications network and a called mobile target subscriber of a cellular digital mobile radio network, a group call number which identifies a target group of mobile subscribers to which the mobile target subscriber belongs being dialled by the calling subscriber, a location of the calling subscriber in the telecommunications network being determined, comprising the steps of:

receiving information identifying the location of the calling subscriber by an access mobile switching system, which in the mobile radio network connects through incoming and outgoing calls from and to the telecommunications network, and from there to a home location register of the mobile radio network;

calling up subscriber data for the mobile subscribers of the target group defined by the group call number by a service control point which, for handling services sustains a network structure of an intelligent network, and transmitting the data to the home location register;

the subscriber data from the home location register to mobile switching systems in whose areas of responsibility the mobile subscribers of the target group are located, and from there information on the locations of the mobile subscribers of the target group being sent back to the home location register;

receiving and evaluating information on locations of the mobile subscribers of the target group and information on the location of the calling subscriber by the service control point and, from this information, the mobile target subscriber is selected by the service control point and notified to the home location register; and establishing a connection with the selected mobile target subscriber by the mobile switching system in the mobile radio network in whose area of responsibility the selected mobile target subscriber is located.

2. The method as claimed in claim 1, wherein a group call number dialled by the calling subscriber of the telecommunications network is converted into a new group call number for the mobile radio network of the called mobile target subscriber.

3. The method as claimed in claim 2, wherein the telecommunications network comprises a hardwired telephone network with at least one service switching point, from which the dialled group call number is connected through to the access mobile switching system of the mobile radio network and is transmitted from there to the service control point, and wherein the location of the calling subscriber is determined by the service control point based on a subscriber call number of the calling subscriber and information on the location of the calling subscriber is transmitted back together with the new group call number to the access mobile switching system.

4. The method as claimed in claim 2, wherein the telecommunications network comprises a hardwired telephone network with the network structure of the intelligent network, which has a connection to the service control point via a service switching point, wherein the dialled group call number is connected through by the service switching point to the service control point, and wherein the location of the calling subscriber is determined by the service control point based on a subscriber call number of the calling subscriber and the information on the location is transmitted back together with a new group call number to the service switching point and is passed on from there to the access mobile switching system of the mobile radio network.

5. The method as claimed in claim 2, wherein the telecommunications network of the calling subscriber comprises a mobile radio network with a mobile switching system responsible for the calling subscriber, by which system the dialled group call number is connected through to the access mobile switching system of the mobile radio network of the called target subscriber and is transmitted from there to the service control point.

6. The method as claimed in claim 5, wherein a request for determining the location of the calling subscriber is directed by the service control point to the mobile switching system which is responsible for the calling subscriber in the mobile radio network, wherein the location of the calling subscriber is provided by this mobile switching system, or by a base station system connected to the mobile switching system, for establishing radio contacts with the mobile subscribers, and wherein the information on the location of the calling subscriber is transmitted together with a new group call number from the responsible mobile switching system of the mobile radio network of the calling subscriber to the access mobile switching system of the mobile radio network of the called target subscriber.

7. The method as claimed in claim 2, wherein the telecommunications network of the calling subscriber comprises a mobile radio network with the network structure of the intelligent network, which has a connection to the service control point, and wherein the dialled group call number is connected through by a mobile switching system, responsible for the calling subscriber, to the service control point.

8. The method as claimed in claim 7, wherein a request for determining the location of the calling subscriber is directed by the service control point to the mobile switching system which is responsible for the calling subscriber in the mobile radio network, wherein the location of the calling subscriber is provided by this mobile switching system, or by a base station system connected to the mobile switching system, for establishing radio contacts with the mobile subscribers, and wherein the information on the location of the calling subscriber is transmitted together with a new group call number from the responsible mobile switching system of the mobile radio network of the calling subscriber to the access mobile switching system of the mobile radio network of the called target subscriber.

9. The method as claimed in claim 1, wherein the mobile subscriber of the target group best suited with respect to the calling subscriber is selected as the mobile target subscriber.

10. The method as claimed in claim 1, wherein locational and/or temporal selection criteria are used for the selection of the mobile target subscriber of the target group.

11. The method as claimed in claim 1, wherein the mobile subscriber of the target group who is locationally closest to the calling subscriber is selected as the mobile target subscriber.

12. The method as claimed in claim 1, wherein the selection of the mobile target subscriber of the target group is carried out based on a selection method equally distributing call load over the mobile subscribers of the target group or according to priorities assigned to the mobile subscribers of the target group.

13. A method of establishing a connection between a calling subscriber of a telecommunications network and a called mobile target subscriber of a cellular digital mobile radio network, a group call number which identifies a target group of mobile subscribers to which the mobile target subscriber belongs being dialled by the calling subscriber, comprising the steps of:

storing subscriber data of mobile subscribers of at least one target group and a respective group call number in a home location register;

receiving the group call number dialled by the calling subscriber by an access mobile switching system, which in the mobile radio network connects through incoming and outgoing calls from and to the telecommunications network, and transmitting the group call number from the switching system to the home location register;

determining by the home location register that the call number is a group call number of a target group;

selecting a mobile target subscriber by the home location register from the mobile subscribers of the target group; and establishing a connection with the selected mobile target subscriber by the mobile switching system in the mobile radio network in whose area of responsibility the selected mobile target subscriber is located.

14. The method as claimed in claim 13, wherein the target group is assigned at least one group call number, of which each group call number of the target group is used to distinguish between target areas of the mobile subscribers of the target group.

15. The method as claimed in claim 13, wherein the mobile subscriber of the target group best suited with respect to the calling subscriber is selected as the mobile target subscriber.

16. The method as claimed in claim 13, wherein locational and/or temporal selection criteria are used for the selection of the mobile target subscriber of the target group.

17. The method as claimed in claim 13, wherein the mobile subscriber of the target group who is locationally closest to the calling subscriber is selected as the mobile target subscriber.

18. The method as claimed in claim 13, wherein the selection of the mobile target subscriber of the target group is carried out based on a selection method equally distributing call load over the mobile subscribers of the target group or according to priorities assigned to the mobile subscribers of the target group.

\* \* \* \* \*